United States Patent [19]
James

[11] Patent Number: 5,328,490
[45] Date of Patent: Jul. 12, 1994

[54] CALCIUM CHLORIDE SALT MANUFACTURING PROCESS

[76] Inventor: Lucas James, 2829 W. Prion Lake Rd., Lake Charles, La. 70605

[21] Appl. No.: 113,338

[22] Filed: Aug. 30, 1993

Related U.S. Application Data

[62] Division of Ser. No. 2,062, Jan. 8, 1993.

[51] Int. Cl.$^5$ ............................................. C22B 1/14
[52] U.S. Cl. .................................. 23/313 R; 159/16.1; 203/47
[58] Field of Search ................. 23/313 R, 293 R; 159/16.1, DIG. 38; 203/47

[56] References Cited

U.S. PATENT DOCUMENTS

| | | | |
|---|---|---|---|
| 2,671,009 | 3/1954 | Comstock | 23/313 |
| 3,250,593 | 5/1966 | Wilcox et al. | 23/313 |
| 3,339,618 | 9/1967 | Bowden et al. | 23/313 R |
| 4,552,566 | 11/1985 | Kita et al. | 23/313 R |
| 5,236,466 | 8/1993 | Lauterbach | 23/313 R |

FOREIGN PATENT DOCUMENTS

| | | | |
|---|---|---|---|
| 575756 | 5/1959 | Canada | 23/313 |
| 934510 | 8/1963 | United Kingdom | 23/313 |
| 1204908 | 9/1970 | United Kingdom | 23/313 |

*Primary Examiner*—Wayne Langel
*Attorney, Agent, or Firm*—Rod Bryant Jordan

[57] ABSTRACT

A method of producing calcium chloride granules of a specific size from a calcium chloride and water solution in a completely closed environment by controlling the rate of fall of a specific size of solution droplet through an up-current of hot, dry gas.

3 Claims, 1 Drawing Sheet

CALCIUM CHLORIDE SALT MANUFACTURING PROCESS

This application is a division of Ser. No. 2,062, filed Jan. 8, 1993.

BACKGROUND OF THE INVENTION

This application is a divisional application based upon the application entitled "Process for Manufacturing Calcium Chloride Salt" Ser. No. 08/002,062, filed by Lucas James on Jan. 8, 1993, pending. Calcium chloride salt is a well known and widely used chemical. It is usually used in a granulated state for a variety of purposes ranging from food preparation to highway de-icing. The design and process disclosed herein provides for the production of this important chemical in a more efficient and economical manner.

DESCRIPTION OF THE PRIOR ART

There are, at present, many methods and machines by which calcium chloride is produced. One example is U.S. Pat. No. 3,339,618 by JOHN H. BOWDEN ET AL, entitled PROCESS FOR PREPARING POWDER AND GRANULAR CALCIUM CHLORIDE PRODUCTS, which discloses a process for producing powdered calcium chloride. Another is U.S. Pat. No. 1,877,733 by 0. V. MARTIN, entitled ANHYDROUS METALLIC CHLORIDES AND THEIR PREPARATION, which discloses a process by which calcium chloride is dried upon and scraped from a roller. These as well as the other various processes fail to produce the product in its most desired form. The product must be further processed to get it into granulated form in most cases. In those cases where a granulated form is produced, the granules must be crushed, sorted, and graded. Many of the processes are environmentally unsafe due to the fact that they employ unsealed processes in which the product comes into contact with the atmosphere during production. The process disclosed herein is environmentally safe because of the fact that it is a sealed process employing equipment in which the product does not come into contact with the atmosphere and where there is no possibility of spillage. The sealed process also solves the problem of plant corrosion which accompanies the usual constant spillage of this corrosive material. This vastly decreases the cost of plant maintenance, and eliminates the cost of handling and reprocessing the spillage.

The process disclosed herein is also much more cost effective than the prior art in that it employs a simpler plant design and therefore requires much less capital investment, maintenance, and space of operation. The energy required for production of properly graded calcium chloride granules is also much less using the method disclosed herein. These concerns and advantages, along with the wide spread and essential use of calcium chloride, render the present invention to be a much needed improvement in calcium chloride production.

SUMMARY OF THE INVENTION

The present invention comprises a process for producing properly graded granulated calcium chloride in a safe and efficient manner. The apparatus for manufacturing is composed primarily of a drying chamber which is generally cylindrical in shape with a conical shaped bottom. A liquid solution of calcium chloride is introduced into the drying chamber through a ring shaped sprinkler. Droplets are sprinkled from the sprinkler which is located at the upper portion of the interior of the drying chamber. The size of the holes in the sprinkler determines the size of the droplets and thus the size of the granules produced. Hot dry air, nitrogen, carbon dioxide, or other hot dry gas is introduced into the drying chamber at the lower portion of the drying chamber and is removed from the upper end of the chamber thus forming an updraft of hot dry gas. This hot dry gas is supplied by a blower, a de-humidifier, and a heater arrangement. The droplets are supported by the updraft and thus suspended in the hot dry gas for sufficient enough time for the water to evaporate leaving a granule of calcium chloride of controlled size. The granule produced then falls to the conical shaped bottom of the drying chamber where it is removed by a rotary valve. The rotary valve is designed to remove the granules without allowing the gas within the system to escape. The dryer gas is continually dehumidified, heated, and recirculated. The volume of the flow of dryer gas is adjusted to the droplet size so as to suspend the droplets in the up-flow of gas at a controlled, very slow rate of fall. After being removed from the drying chamber the granulated calcium chloride is transported by a blower conveyer to a dry granule separator -storage bin. Once inside the storage bin the granules of calcium chloride are separated from the conveyer gas and collected in the lower portion of the storage bin. A second rotary valve removes the calcium chloride from the storage bin, again, without allowing the escape of blower conveyer gas, therefore providing for a totally closed system.

BRIEF DESCRIPTION OF THE DRAWINGS

Figure one is a mechanical block diagram of the granulated calcium chloride production system.

DETAILED DESCRIPTION

Figure 1:
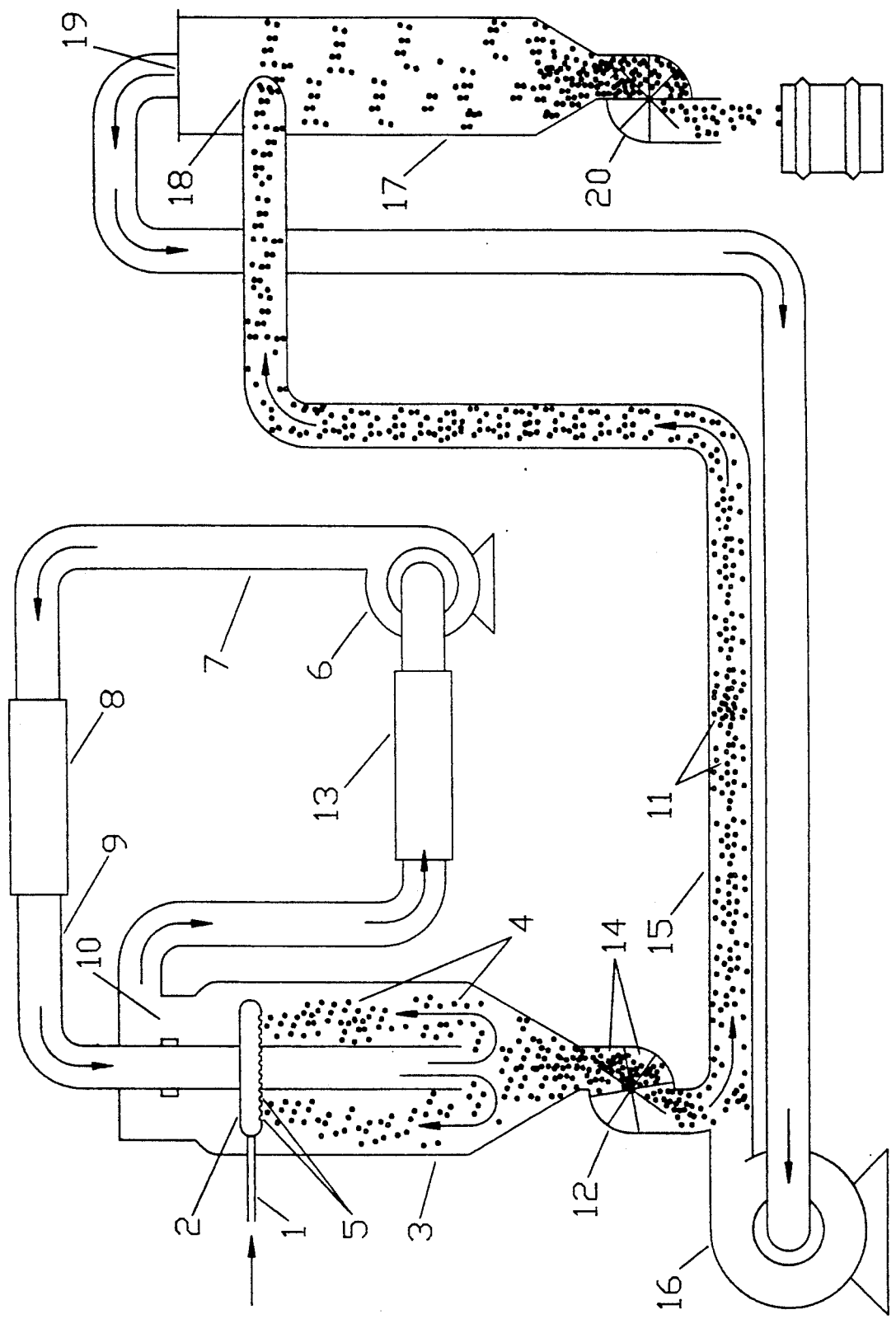

Referring to figure one it can be seen that calcium chloride in a liquid solution is fed through a feed pipe 1 into a sprinkler ring 2. The sprinkler ring 2 is located within the upper portion of a vertically cylindrical drying chamber 3, and discharges the solution into the upper portion of the drying chamber 3 in the form of droplets 4. The sprinkler ring has discharge holes 5 around its circumference. The solution is discharged through these discharge holes 5, therefore, the size of the droplets is determined by the size of the discharge holes. The size of the calcium chloride granules is in turn determined by the size of the droplets.

A dryer gas blower 6 forces gas through a dryer gas blower discharge pipe 7 and through a drier gas heater 8. The heated gas then travels through drier gas feed pipe 9 which extends from the dryer gas heater 8, through the top of the drying chamber 3 and down to the lower portion of the drying chamber 3. The heated gas is discharged into the drying chamber 3 at the lower portion of the drying chamber 3. In order to escape the drying chamber 3 the heated gas must exit through the heater gas exit port 10 at the top of the drying chamber 3. This causes an adjustable, constant, upward current of hot dry gas within the drying chamber 3. As the droplets 4 are discharged from the sprinkler ring 2 they are held in suspension by the upward current of hot, dry gas. During this suspension period the water is evaporated from each droplet of calcium chloride solution leaving only the calcium chloride 11 in the form of a granule which falls slowly to the bottom of the drying chamber 3. The bottom of the drying chamber 3 is conical in shape therefore forming a funnel which directs the calcium chloride granules into a dryer outlet rotary valve 12.

The air exiting the drying chamber 3 through the dryer gas exit port 10 is then forced through a dehumidifier 13. The water that was evaporated into the gas during the evaporation process within the drying chamber 3 is removed by the dehumidifier 13. The gas is circulated back through the system by the dryer gas blower 6. This provides for a completely closed system of dryer gas circulation.

The dryer outlet rotary valve 12 located at the funnel shaped bottom of the drying chamber 3 is so designed as to remove the calcium chloride granules from the drying chamber 3 without allowing the dryer gas to escape the system. The calcium chloride granules fall into the cavities 14 of the dryer outlet rotary valve 12 and are deposited in a dry granule conveyer pipe 15. A conveyer gas blower 16 forces gas through the dry granule conveyer pipe 15, into the upper portion of the dry granule separator—storage bin 17, through separator inlet port 18, out separator exit port 19, and back to the conveyer gas blower 16, to form a continual cycle. The granules of dry calcium chloride are carried by the gas current into the separator—storage bin 17. The granules of dried calcium chloride then fall to the bottom of the separator—storage bin 17, which is also conical in shape, and are directed to a product outlet rotary valve 20. This product outlet rotary valve 20 removes the granules of calcium chloride from the separator—storage bin 17 for packaging without allowing the conveyer gas to leave the system. This provides for a totally closed conveyer system.

It is submitted that the process of manufacturing calcium chloride salt granules as disclosed above constitutes a vast improvement upon all previously used methods. The process is clean, maintenance free, and environmentally safe due to the fact that it is a sealed process. It produces a uniform product of desired size without further processing. The system is simple, and compact in design, and therefore requires a much smaller capital investment and space of operation. The process requires much less energy per unit produced than that which is required by conventional methods. It is, therefore, submitted that the process disclosed herein provides a new, useful, nonobvious method of producing calcium chloride salt granules.

I claim:

1. A process of producing calcium chloride granules from a solution of calcium chloride and water comprising;
   a. introducing droplets of calcium chloride and water solution into an enclosed chamber, said chamber having an upper and lower portion, said droplets being introduced into said upper chamber;
   b. introducing a current of hot, dry gas into said chamber, said current of hot, dry gas flowing from said lower portion of said chamber to said upper portion of said chamber;
   c. adjusting the flow of said current of hot, dry gas so as to suspend said droplets in said current of hot, dry gas at a controlled rate of fall for sufficient time so as to remove said water from said droplets through evaporation, said calcium chloride within said droplets thereby forming said granules; and
   d. removing said granules from said chamber without opening said chamber.

2. A process as recited in claim 1, wherein said hot, dry gas is air.

3. A process as recited in claim 1, wherein said droplets of calcium chloride solution are of a specific size, said size determining the size of said granules of calcium chloride.

* * * * *